2,995,228
AUTOMATIC BRAKE FOR ROTARY APPARATUS HAVING A LARGE INERTIA
Joseph Antoine Noël Rousselet, Annonay, France
Filed May 8, 1958, Ser. No. 734,050
Claims priority, application France May 29, 1957
2 Claims. (Cl. 192—16)

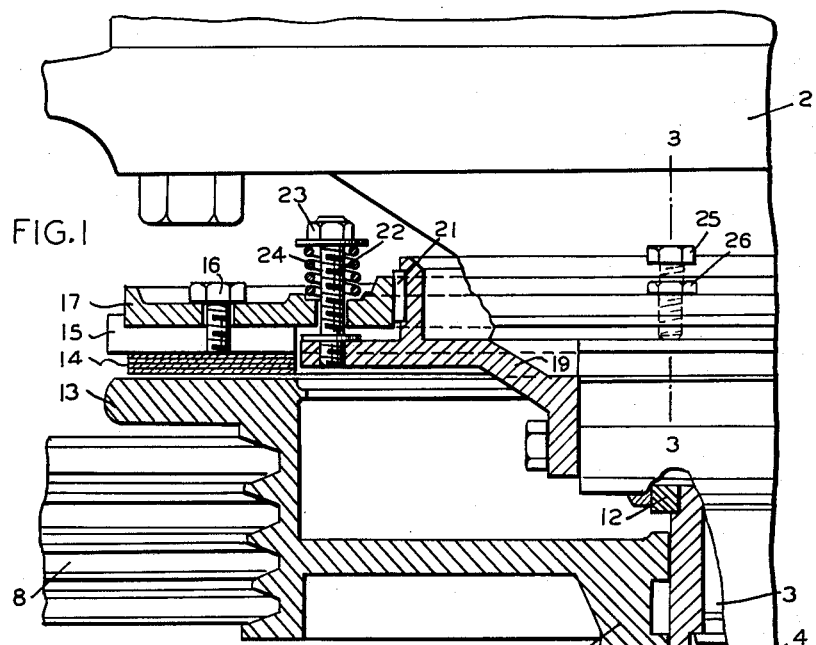
FIG.1
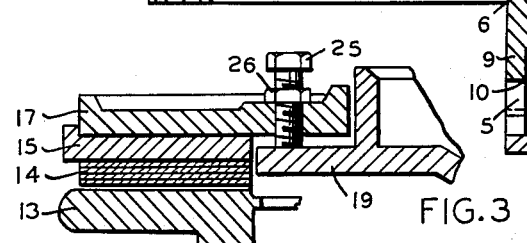
FIG.3
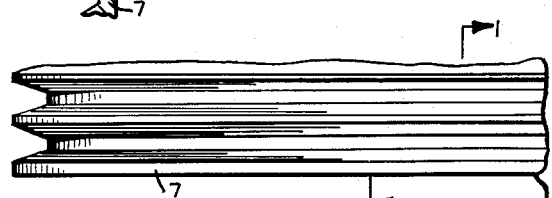
FIG.2
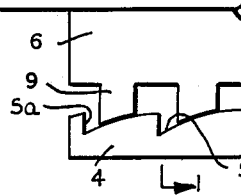
*INVENTOR:*
JOSEPH ANTOINE NOEL ROUSSELET
BY
Richardson, David and Nardon
ATTORNEYS.

Rotary apparatus provided with a large inertia are always equipped with a mechanical, electrical, hydraulic or pneumatic braking system which allows holding the apparatus fast, thus being particularly important in the case of centrifugal drying machines when their driving motor stops actuating them.

Generally, such brakes are controlled by levers, electromagnets or the like and show the drawback not only of being complex, but also of requiring manual control.

It has been proposed, it is true, to make the brakes operate automatically, as soon as the driving motor stops, this being provided by the longitudinal shifting in a direction facing a stationary braking plate of a movable surface rigid with the driving pulley of the apparatus. To this end, the pulley is secured, for instance, to a threaded section of the machine shaft, in a manner such that, according as to whether said shaft is driven only by the motor or through the inertia of the machine, said braking surface does not engage or, on the contrary, engages the stationary braking plate.

Said automatic brakes are however so intricate in structure and their cost price is so high that, in spite of their advantages, they are not in common use.

My invention cuts out these drawbacks and it has for its object a particularly simple arrangement of an automatic brake of this type, wherein the pulley driven by the operative motor is provided with a large flange, the outer surface of which registers with a braking plate arranged horizontally underneath the vat of the apparatus constituted say by a drying machine, said pulley incorporating a hub, the lower surface of which is provided with teeth engaging the upper surface cut into the shape of a clutch tooth provided with helical slopes formed on a socket keyed to the shaft driving the apparatus.

Furthermore, and in accordance with a preferred embodiment of my automatic brake, the braking plate against which the flange of the pulley is adapted to bear is not stationary but is longitudinally movable and is subjected to the action of at least one spring urging it into movement in the direction of the pulley.

I have illustrated by way of example and by no means in a limiting sense a preferred embodiment of such an automatic brake in the accompanying drawings, in which:

FIG. 1 is a vertical cross-sectional view of the brake system in its released position.

FIG. 2 is a detail view of the dog-clutch and pulley incorporated with said brake.

FIG. 3 is a vertical cross-section perpendicular to the plane of FIG. 1 along line III—III of FIG. 1.

As illustrated, 2 designates the casing of the drying machine inside which revolves a basket which is not illustrated and which is keyed to the shaft 3. At its lower end, the shaft carries a socket 4 which is keyed to it and the lower section of which is of a larger diameter, the upper surface of which lower section is cut in the shape of a ratchet wheel having dog clutch teeth the outline of each of which includes a helical section 5 and a step 5a following same. Coaxially with the socket 4, there is revolubly fitted round the latter the hub 6 of a pulley 7 which is driven into rotation by a belt 8 upon starting of a motor which is not illustrated. The lower surface of the hub 6 of the pulley is provided with teeth 9 engaging the helical sections 5 of the dog-clutch. A torsion coil spring 10 is fitted between the clutch teeth and the hub of the pulley with a view to bringing the receding movement of the pulley to completion at the moment of the stoppage of the motor. Said spring 10 engages through its ends the socket 4 and the hub 6 of the pulley 7 respectively, said ends being bent and engaging blind openings provided in said parts 4 and 6. A stationary ring 12 is provided outside the upper end of the socket 4 for limiting the upward movement of the hub 6 of the pulley along the socket 4.

The stationary braking surface is constituted by a lining 14 rigid with an annular plate 15 carried by studs 16, the shanks of which pass freely through openings provided inside a disc 17 and the heads of which bear on the upper surface of the latter.

Said disc 17 is carried in vertical sliding relationship by a stationary guiding member 19 over which it may slide longitudinally as provided by the vertically slidable key 21. This guiding member 19 carries rigid studs 22 which serve with the assistance of the nuts and washers 23 as stationary bearings for the springs 24 which are coaxial with the studs and exert a downwardly directed thrust on the disc 17 and consequently on the brake lining 14; bolts 25 allow adjusting the clearance between the lining 14 and the upper flange 13 on the pulley 7. Said bolts are screwed as shown more clearly in FIG. 3 inside the disc 17 and abut through the ends of their shanks against the stationary member 19 which serves as a guide for the disc 17. Counter nuts 26 ensure the locking of the bolts 25 against any shifting out of their adjusted positions.

When the motor drives the drying machine, the pulley 7 drives the socket 4 and thereby the shaft 3 so that the spring 10 is slightly twisted and the drive is ensured through engagement between the teeth 9 on the pulley and the steps 5a of the dog clutch.

As soon as the motor is deenergized, the passive resistances arising in the motor and the friction exerted by the belt leads to a slowing down of the pulley 7 while the impulse given by the release of the torsion spring 10 and the continued rotation of the basket of the driving machine lead to an upward sliding of the teeth 9 over the helical sections 5 of the dog-clutch teeth. Consequently the pulley 7 moves bodily upwards and the flange 13 of said pulley engages the brake lining 14, which latter slide upwardly in its turn and compress the springs 24 through the disc 17 extending therebetween. This results in a braking of the pulley 7, of the shaft 3 and of the basket of the drying machine, which braking continues until the drying machine has completely stopped. At this moment, only, the springs 24 urge the flange 13 of the pulley 7 downwardly through the agency of the disc 17 of the annular plate 15 and of the lining 14, so that said pulley returns into its starting point by sliding over the helical sections 5, the teeth 9 engaging then the steps 5a.

Obviously, the invention is by no means limited to the sole embodiment of the automatic brake which has been described hereinabove by way of example and it covers in contradistinction all the modifications thereof falling within the scope of the accompanying claims.

What I claim is:

1. In a centrifugal machine including a rotary section having a large inertia, the combination comprising a shaft driving the rotary section; a rotatable driving pulley coaxial with the shaft and adapted to slide axially along the shaft, said pulley including a flange at one end and a hub at the other end; a non-rotary disc coaxial with the pulley and shiftable axially of the pulley, said disc having a braking surface facing said flange and spaced therefrom; a stationary guide member parallel with said disc; bolts engaging the guide member and extending parallel to the axis of the pulley, each bolt having a washer beyond said guide member and said disc; an adjustable spring fitted between said washer and said disc and urging the latter towards said flange; a socket keyed to said shaft and including another flange registering with an end of said hub; and a dog-clutch including an annular series of ratchet teeth rigid with said end of the hub; another annular series of teeth rigid with said other flange and facing the ratchet teeth, each tooth of said other annular series having a helical section followed by a step adapted to be operatively driven by a cooperating tooth of said ratchet teeth; and a helical spring fitted between said other flange and said end of the hub and urging the pulley against its operative direction of rotation as provided by contact of the ratchet teeth with the steps of the other series of teeth, whereby the ratchet teeth ride over the helical sections of the other series of teeth due to inertia of said rotary section and shift the pulley towards said braking surface for stopping rotation of said pulley and shaft.

2. In a centrifugal machine, the combination according to claim 1, further comprising a bolt threadedly engaged with said disc and abutting said guide member to adjust the spacing of the disc and braking surface with respect to the flange of the pulley.

References Cited in the file of this patent

UNITED STATES PATENTS

| | | |
|---|---|---|
| 1,438,150 | Voss | Dec. 5, 1922 |
| 1,537,624 | Simpson | May 12, 1925 |
| 1,694,810 | Dunham | Dec. 11, 1928 |
| 2,428,337 | Munschauer | Sept. 30, 1947 |
| 2,675,898 | Morgan | Apr. 20, 1954 |
| 2,803,323 | Newell | Aug. 20, 1957 |